Sept. 23, 1969 A. C. ERPEL 3,469,103

PHOTOELECTRIC PUNCHED PAPER TAPE READER REJECTING DIFFUSED LIGHT RAYS

Filed Jan. 18, 1966

INVENTOR

ADOLPH C. ERPEL

BY Watson, Cole Grindle & Watson

ATTORNEYS

United States Patent Office 3,469,103
Patented Sept. 23, 1969

3,469,103
PHOTOELECTRIC PUNCHED PAPER TAPE READER REJECTING DIFFUSED LIGHT RAYS

Adolph C. Erpel, Warrington, Pa., assignor to Navigation Computer Corporation, a corporation of Pennsylvania
Filed Jan. 18, 1966, Ser. No. 521,324
Int. Cl. G01n 21/30
U.S. Cl. 250—219 4 Claims

ABSTRACT OF THE DISCLOSURE

An optical punched paper tape reader works on a light diffusing principle with light source and a photoelectric detector spaced from the punched holes and located in collimator tubes, which in one form comprise screw threads, so that only a small portion of light passing through relative transparent sections of tape, such as at grease spots, can reach the detector, while a large part of the light is directed to the detector through a hole in the paper.

This invention relates to photoelectric detectors and, more particularly, to photo reading devices for sensing coded holes in paper tape. Most photo sensitive readers that are in conventional use today, operate on the principle of opaqueness which theorizes that little light is transmitted through the paper as opposed to the amount of light which will pass through when there is a hole in the paper. The photo cells are customarily placed close to the punch paper tape that is being sensed and the signal to noise ratio of the hole to no hole configurations on the tape is limited by the degree of opaqueness of the paper tape. In such readers almost all the light that is transmitted through the paper tape is captured by the photo cell.

Ordinary parchment paper tape when oiled, or after picking up oil spots, may have as low as 2 to 1 in hole to no-hole light transmission ratio. This ratio is so low as to make the worst case design of photo cell reading systems extremely difficult. The problem is even further aggravated by the fact that the light bulb will change intensity over the life of the equipment, or Edison effect can cloud the bulb envelope and further reduce the light intensity.

It is therefore one object of this invention to provide an extremely simple and economical reading head which incorporates the most inexpensive photo diodes and which permits very high signal to noise ratios between holes and tape which, in turn, enables improved tolerances in the design of associated circuitry and light sources.

Another object of this invention is to provide a simple photo sensitive punched paper tape reading head, which requires no elaborate lens systems to collimate the light source.

Still another object of this invention is to provide a photo sensitive paper tape read head which allows an entire column of side-by-side punched holes in a standard paper tape to be read simultaneously without interference.

It is yet another object of this invention to provide a simplified photo sensitive paper tape read head which does not require light shielding or covers which make it difficult to place the tape in position over the head and which prevent observation of the paper tape when it is in the reading position.

It is another object of the invention to provide an extremely simple photo sensitive read head which enables small, long-life, and low current light sources to be used, enabling the small amount of power required to be dissipated in the holding block without elaborate cooling systems.

Thus, in accordance with the invention a distinction is made between bundles or columns of light rays transmitted through punched holes in paper tape and diversely directed rays reflected from and transmitted in a diffuse manner from the fibers of the paper tape where no hole exists in the path of the ray bundles to produce a significantly improved signal to noise ratio between hole and no-hole configurations. In utilizing such a photo reading technique an improved reading head configuration is provided by confining light into bundles of rays on both sides of the paper tape without a collimating lens by medium of holes threaded in opaque blocks such as black anodized aluminum. The detection head block is spaced far enough away from the paper tape to receive only a very small number of the rays from the bundle when they are diffused through the paper at a no-hole code configuration, thereby giving an improved signal to noise ratio in the order of over 100 to 1. A flat glass plate or block is interspersed between the threaded light source hole and the paper tape to serve as a dust stop preventing deterioration of optical properties in the threaded hole, and to permit more light energy to be reflected and diffused backwards when it strikes the paper.

The foregoing features and others that lend themselves to improved performance, ease of construction, and low cost, will be more obvious with the following description, with reference to the accompanying drawing, wherein.

Figures 1, 3:
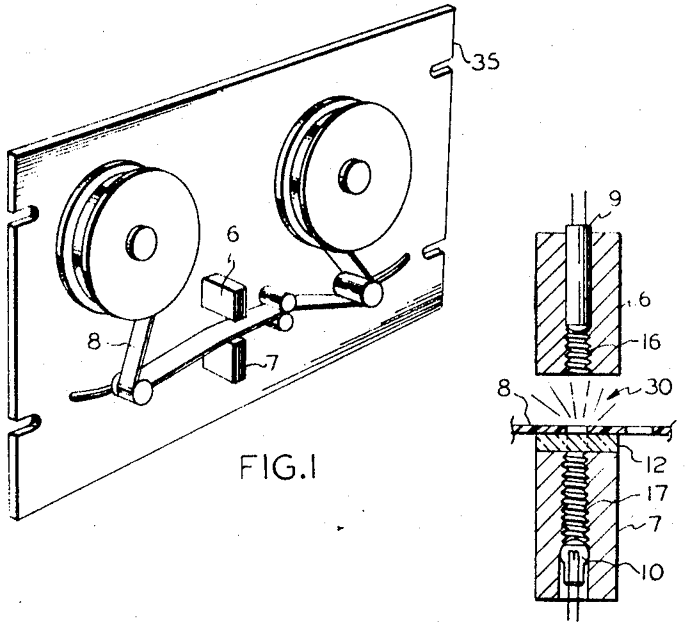
FIGURE 1 shows an isometric view of a typical reader mount as it would appear on a panel containing punch paper tape spoolers.
FIGURE 3 shows a similar elevation view for a no-hole tape code configuration.

Each reading head has a set of two aligned light aperture assemblies 6, 7 between which the punch paper tape 8 passes. In the upper aperture assembly 6 (as shown in the drawing) is a photo detector cell 9 which receives light from a lamp 10 in the lower aperture assembly 7. The paper tape 8 is passed along the surface of a flat glass plate 12 disposed over the exit hole or gate of the lower light source aperture assembly 7, whereas a significant distant 14 is maintained between the upper detector cell aperture assembly and the surface of the paper tape 8.

It has been customary in optical punch paper tape readers to use collimating lenses to form parallel light rays, but this becomes impractical for a plurality of closely spaced holes across a standard one inch paper tape, since a single large lens must be big enough to confine the rays into central lens regions over the entire span to avoid distortion and individual lenses for each hole are so small that small defects cause a large degree of distortion.

It has been discovered that significant improvement in signal to noise ratios can be obtained without such lenses by the construction the light aperture assemblies 6 and 7 to have threaded holes 16, 17. These can be prepared easily, while eliminating undesirable internal reflections that cause fringing and interference between closely spaced adjacent holes, particularly in a detector assembly 6 spaced away from the surface of the paper, by threading holes in aluminum blocks and processing at least the hole areas inside the blocks by black anodizing.

Figure 2:
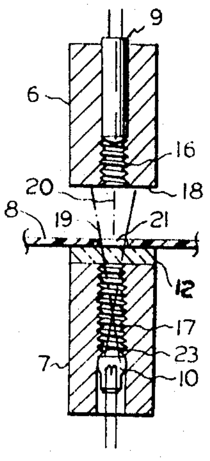
FIGURE 2 shows an elevation view partly in section of a reader assembly for a coded hole tape configuration.
Figure 4:
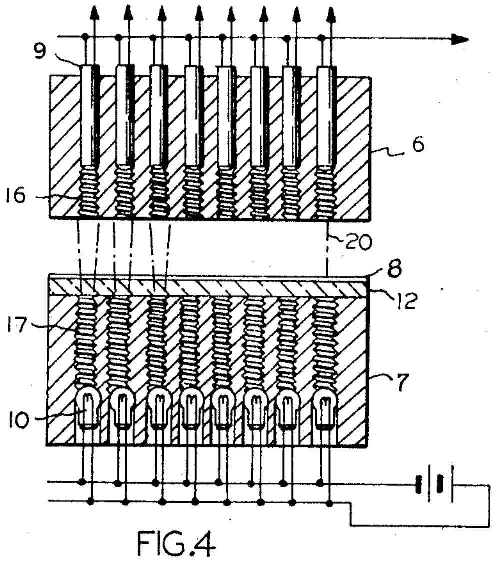

With this configuration, the reading process for a hole coded in the paper tape can be viewed from FIGURE 2. The threaded hole 17 serves to direct rays from lamp 10 into a columnar bundle of rays without significant internal scattering and reflections. This bundle of rays is directed along the axis 20 of hole 17 and into the corresponding detection hole 16 placed along the same axis 20 and is confined to an incident area on the surface 18 at the detector assembly 6 by limiting rays 19 at the edges of the hole in block 7. Thus, a substantial portion of the entire light energy of lamp 10 may be passed through hole 21 in paper tape 8 to be received by photo cell 9. The threaded holes are substantially the same size as the coded tape holes 21 to pass maximum energy therethrough without interference with adjacent cells as shown in FIGURE 4. The threads prevent fringing and dispersion from the exit gate surface of the holes 17 which might enter adjacent detector holes 16. Even should this happen; however, as with extraneous ambient light for example, the threaded structure serves to dissipate the light without adverse affect on photo cells 9.

The lamp 10 may be of the type with a semi-lens 23 built on the end which helps concentrate the light rays through the light aperture 17. It is chosen with just enough power to operate photo cell 9 near optimum maximum signal condition under worst case conditions. Since little light is lost in lens systems etc., the lamp may be miniature and generally needs no cooling other than the metal body of the light aperture assembly 7, which can have air cooling fins if desired.

The reduction of signal strength at photo cell 9 incurred when a no-hole code configuration is received in paper tape 8 is shown in FIGURE 3. The paper tape 8 serves as a diffusing medium wherein the rays 30 emanate in all directions as they are diffused from paper fibers. A significant amount of the light energy is diffused backward and reflected off the paper tape surface, and may dissipated by medium of the glass plate spacer 12 which also serves to keep dust out of the light aperture 17, yet which does not impede the transmission of the desired light bundles in the reading configuration of FIGURE 2.

It may be seen that if the read assembly 6 were placed near the surface of paper tape 8, most of the diffused rays would enter aperture 16. However, by maintaining a significant separation distance 14, only a few of the diffused rays can enter the threaded hole 16, and the angle of entry for most of the rays is so far from being axially directed into the hole 16 that they fail to reach photo cell 9 and become dissipated by action of the threads. Thus, it is easy to establish signal to noise ratios better than 100 to 1 with this configuration, even when operating with small lamp sources 10 in ambient daylight without light shields over the reading heads 6, 7 on tape spooler panel 35 in FIGURE 1.

Figure 5:
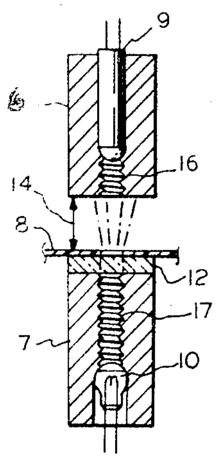
FIGURES 4 and 5 are respectively side and end views, partly in section, of a head for simultaneous reading of the block of eight coded hole positions generally appearing across one column of a one inch wide standard punch paper tape.

This reading method and the simplified optical reader construction is easily adapted for parallel column reading in standard paper tape where eight holes spaced with one-tenth inch between centers across one inch wide tape. Such a reading head is constructed as shown in FIGURES 4 and 5 with conventional tooling without any serious problems in obtaining tolerances to keep the rays in a bundle and directed along the axes 20 without interference in adjacent channels.

It is seen therefore that this invention has improved the state of the art providing simplified paper tape punch reading apparatus, not requiring strict manufacturing tolerances, yet affording superior performance.

Those novel features which are representative of the nature and the scope of the invention are defined with particularity in the appended claims.

What is claimed is:

1. A photoelectric reader for punched paper tape comprising in combination two separate light confining apertures each comprising a threaded hole having a diameter nearly that of the holes punched in the tape extending through an opaque block, a photo cell mounted at one end of the threaded hole of a first of said apertures, a light source mounted at one end of the threaded hole of the other said aperture, and means positioning the remaining ends of the threaded holes in the said apertures on opposite sides of a punched paper tape with said first aperture spaced away from the surface of the paper tape a distance sufficient to permit a high percentage of light diffused through the paper to strike outside the threaded hole.

2. A reader as defined in claim 1 wherein a flat block of glass is interposed between the second said aperture and the surface of the paper tape.

3. A reader as defined in claim 1 wherein the opaque block is aluminum with a surface treatment of black anodization at least in the threaded holes.

4. A photoelectric reader for punched documents comprising in combination, light source means, first means including collimating means with a non-reflecting interior surface confining a bundle of light rays from the source to emanate from an exit gate in a column of a dimension nearly the diameter of the holes punched in said document, a substantially flat glass block positioned to receive light from the exit gate, means holding the document on the surface of the glass block remote from the exit gate, including second collimating means positioned to receive light bundles closely confined about an axis from said column of rays and placed far enough away from the surface of said document to receive only a small percentage of rays which are diffused through the body of said document, and a photo detection cell placed to receive rays passing through said second means.

References Cited

UNITED STATES PATENTS

| | | | |
|---|---|---|---|
| 2,242,317 | 5/1941 | Metcalf | 250—237 X |
| 2,916,624 | 12/1959 | Angel et al. | |
| 3,011,387 | 12/1961 | Johnson | 250—218 X |
| 3,031,351 | 4/1962 | McIlvaine | 250—237 |
| 3,240,109 | 3/1966 | Grant | 250—218 X |
| 3,248,554 | 4/1966 | Chen. | |
| 3,183,361 | 5/1965 | Bronson et al. | 250—239 |
| 2,617,048 | 11/1952 | Wagner et al. | |
| 3,365,568 | 1/1968 | Germen. | |
| 3,297,879 | 1/1967 | Meyer. | |

OTHER REFERENCES

IBM Technical Disclosure Bulletin, Goldbach et al., vol. 6, No. 6, November 1963, p. 74.

WALTER STOLWEIN, Primary Examiner

U.S. Cl. X.R.

250—239